(12) United States Patent
Déjean et al.

(10) Patent No.: US 7,937,653 B2
(45) Date of Patent: May 3, 2011

(54) METHOD AND APPARATUS FOR DETECTING PAGINATION CONSTRUCTS INCLUDING A HEADER AND A FOOTER IN LEGACY DOCUMENTS

(75) Inventors: Hervé Déjean, Grenoble (FR); Jean-Luc Meunier, St. Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 1285 days.

(21) Appl. No.: 11/032,817

(22) Filed: Jan. 10, 2005

(65) Prior Publication Data

US 2006/0156226 A1    Jul. 13, 2006

(51) Int. Cl.
*G06F 17/00* (2006.01)
(52) U.S. Cl. ......... 715/234; 715/239; 715/251; 715/243
(58) Field of Classification Search .................. 715/243, 715/246, 249, 251, 234, 239, 253
See application file for complete search history.

(56) References Cited

U.S. PATENT DOCUMENTS

| | | | |
|---|---|---|---|
| 5,434,962 | A | 7/1995 | Kyojima et al. |
| 5,491,628 | A | 2/1996 | Wakayama et al. |
| 6,298,357 | B1 | 10/2001 | Wexler et al. |
| 6,353,840 | B2 * | 3/2002 | Saito et al. .................. 715/202 |
| 6,470,306 | B1 * | 10/2002 | Pringle et al. .................... 704/3 |
| 6,487,566 | B1 | 11/2002 | Sundaresan |
| 6,490,603 | B1 | 12/2002 | Keenan et al. |
| 7,310,773 | B2 * | 12/2007 | Lin .............................. 715/210 |
| 2002/0143818 | A1 | 10/2002 | Roberts et al. |
| 2003/0093760 | A1 | 5/2003 | Suzuki et al. |
| 2003/0208502 | A1 | 11/2003 | Lin |
| 2004/0139384 | A1 * | 7/2004 | Lin .............................. 715/500 |
| 2005/0154979 | A1 * | 7/2005 | Chidlovskii et al. .......... 715/513 |
| 2006/0101058 | A1 * | 5/2006 | Chidlovskii .................. 707/102 |

OTHER PUBLICATIONS

Adler, S., et al., "Extensible stylesheet language (XSL), Version 1.0," W3C 2001, http://www.w3.org/TR/2001/REC-xsl-20011015/.
Aiello, M., Monz, C., Todoran, L., Worring, M., "Document understanding for a broad class of documents", International Journal on Document Analysis and Recognition (IJDAR), vol. 5, 2002, Springer-Verlag, pp. 1-16.
Anjewierden, A., "AIDAS: Incremental logical structure discovery in PDF documents", Proceedings of the International Conference on Document Analysis and Recognition (ICDAR), Seattle, 2001.
Belaïd, A., Pierron, L., Valverde, N., "Part-of-speech tagging for table of contents recognition", International Conference on Pattern Recognition (ICPR 2000), vol. 4, Sep. 3-8, 2000 Barcelona, Spain.

(Continued)

*Primary Examiner* — Stephen S Hong
*Assistant Examiner* — Matthew J Ludwig
(74) *Attorney, Agent, or Firm* — Fay Sharpe LLP

(57) ABSTRACT

A method for identifying header/footer content of a document, in order to sequence text fragments comprising recognizable text blocks as derived from the document. The textual variability of lines comprised of text blocks, including the different kinds of text blocks within the line is analyzed for assessment of textual variability. Header/footer zones are defined by textual content having a low textual variability. An alternative embodiment identifies pagination constructs by comparing selected text-boxes for similarity and proximity and clustering the text boxes satisfying a predetermined similarity value, wherein the clustered text boxes are deemed to comprise pagination constructs.

18 Claims, 5 Drawing Sheets

OTHER PUBLICATIONS

Figure 1:
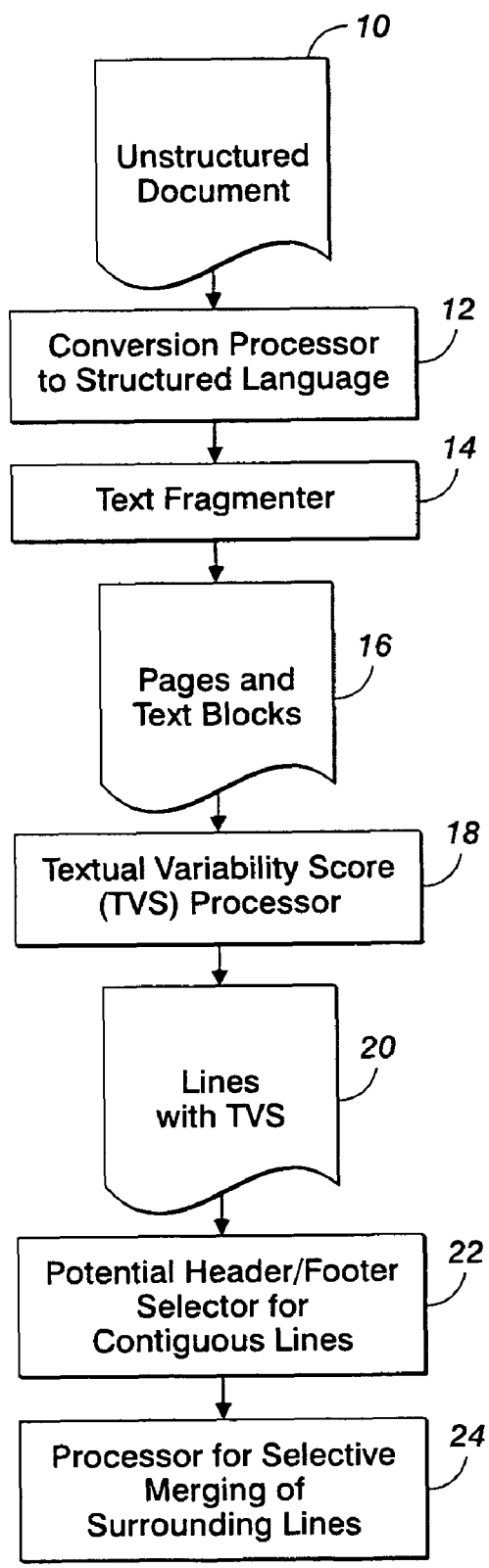

Dori, D., Doermann, D., Shin, C., Haralick, R., Phillips, I., Buchman, M., Ross, D., "The representation of document structure: A generic object-process analysis", Chapter XX, *Handbook on Optical Character Recognition and Document Image Analysis*, World Scientific Publishing Company. 1995/1996, pp. 000-000.

Dori, D., Doermann, D., Shin, C., Haralick, R., Phillips, I., Buchman, M., Ross, D., "The representation of document structure: A generic object-process analysis", Chapter 16, *Handbook of Character Recognition and Document Image Analysis*, World Scientific Publishing Company, 1997, pp. 421-456.

Klink, S., Dengel, A., Kieninger, T., "Document structure analysis based on layout and textual features", Pcroceedings of Fourth IAPR International Workshop on Document Analysis Systems, DAS 2000, Rio de Janeiro, Brazil, 2000, pp. 99-111.

Lin, C.C., Niwa, Y., Narita, S., "Logical structure analysis of book document images using contents of information", 4th International Conference on Document Analysis and Recognition (ICDAR'97), Ulm, Germany, Aug. 1997, pp. 1048, 1054.

Lin, X., "Header and footer extraction by page-association", Hewlett-Packard Company Technical Report, 2002, www.hpl.hp.com/techreports/2002/hpl-2002-129.pdf.

Lin, X., "Text-mining based journal splitting", Proceedings of the Seventh International Conference on Document Analysis and Recognition (ICDAR 2003), vol. II, Aug. 3-6, 2003, Edinburgh, Scotland.

Lin, X., Simske, S., "Automatic document navigation for digital content re-mastering", SPIE COnference on Document Recognition and Retrieval XI, Jan. 18-22, 2004, San Jose, CA.

Power, R., Scott, D., Bouayad-Agha, N., "Document Structure", Computational Linguistics, vol. 29, No. 2, 2003, pp. 211-260.

Satoh, S., Takasu, A., Katsura, E., "An automated generation of electronic library based on document image understanding", Proceedings of the Third International Conference on Document Analysis and Recognition (ICDAR'95), vol. 1, Aug. 14-15, 1995, Tokyo, Japan, pp. 163-166.

Summers, K.M., "Automatic discovery of logical document structure", PhD thesis, Cornell University, Computer Science Department, Aug. 1998, pp. 1-181.

Virk, R., "Converting PDF files into XML", *CambridgeDocs*, 2004, www.cambridgedocs.com.

U.S. Appl. No. 11/032,814, filed Jan. 10, 2005, Herve Dejean et al.

U.S. Appl. No. 11/033,016, filed Jan. 10, 2005, Herve Dejean et al.

Xiaofan Lin, "Header and Footer Extraction by Page-Association" [Online] 2002, pp. 1-8, XP002533579, Retrieved from the Internet: URL:http://citeseerx.ist.psu.edu/viewdoc/summary?doi=10.1.1.11.6211 [retrieved on Jun. 23, 2009].

Xiaofan Lin, "Header and Footer Extraction by Page-Association" HP Labs Technical Reports, [Online] Dec. 26, 2002 XP002533592, Retrieved from the Internet: URL:http://web.archive.org/web/20021226015423/http://www.hpl.hp.com/techreports/2002/HPL-2002-129.html [retrieved on Jun. 23, 2009].

Xiaofan Lin, "Header and Footer Extraction by Page-Association" CITESEERX Abstract, [Online] 2002, XP002543906, Retrieved from the Internet: URL:http://citeseerx.ist.psu.edu/viewdoc/summary?doi=10.1.1.11.6211 [retrieved on Jun. 23, 2009].

Herve Dejean, et al., "Versatile Page Numbering Analysis", Xerox Publications, [Online] XP002533713, Retrieved from the Internet: URL:http://www.xrce.xerox.com/Publications/Attachments/2007-031/2007-031.pdf [retrieved on Jun. 24, 2009].

Xiaofan Lin, "Header and Footer Extraction by Page-Association" Document Recognition and Retrieval X-DRR 2003: Santa Clara, California, USA (Layout Analysis), [Online] pp. 1-3, XP002543907, Universitat Trier, Retrieved from the Internet: URL:http://www.informatik.uni-trier.de/(ley/db/conf/drr/drr2003.html#Lin03 [retrieved on Jun. 23, 2009].

Anonymous, "Document Recognition and Retreval X (Proceedings of SPIE/IS&T): Header and Footer Extraction by Page-Association from Xiaofan Lin" Imaging Online Publications Catalog, [Online] vo. 5010, XP002543908, Retrieved from the Internet: URL:http://www.imaging.org/ScriptContent/store/physpub.cfm?seriesid=24&pubid=571 [retriefed on Jun. 23, 2009].

European Search Report, Application No. 06100200.2-1527/1679613, Dated Sep. 11, 2009, Berlin, Germany.

* cited by examiner

```
1
2           xxxxxxxx
3
4
5   Xxxxxxxxxxx

Xxxxxxxxxxxxxxxxxxxxxx
    Xxxxxxxxxxxxxxxxxxxxxx
    Xxxxxxxxxxxxxx

⋮

Xxxx
    Xxxx 39
40  xx                    xxxx
```

*FIG. 3A*

```
x ─────────────►
  <text x="41" y="45">xxxxxxxx
y </text>
  <text x="11" y="125">Xxxxxxxx
  xxxx</text>
  <text x="11" y="245">Xxxxxxxx
  xxxxxxxxxxxxxxxxx</text>
         ⋮
```

*FIG. 3B*

METHOD AND APPARATUS FOR DETECTING PAGINATION CONSTRUCTS INCLUDING A HEADER AND A FOOTER IN LEGACY DOCUMENTS

BACKGROUND

The following relates to the information storage and processing arts. It finds application in conjunction with electronic document format conversion and in particular with cataloging of legacy documents in a marked-up format such as extensible markup language (XML), standard generalized markup language (SGML), hypertext markup language (HTML), or the like, and will be described with particular reference thereto. However, it is to be appreciated that the following is amenable to other like applications.

Legacy document conversion relates to converting unstructured documents existing in formats such as Adobe portable document format (PDF), various text formats, various word processing formats, and the like into structured documents employing a markup language such as XML, SGML, HTML, and the like. In structured documents, content is organized into delineated sections such as document pages with suitable headers/footers and so forth. Alternatively, a textual header of a table spanning out multiple pages comprises a pagination construct when this header repeats itself on those pages. Such organization typically is implemented using markup tags. In some structured document formats such as XML, a document type definition (DTD) or similar document portion provides overall information about the document, such as an identification of the sections, and facilitates complex document structures such as nested sections.

There is thus interest in converting unstructured documents to a structured format when such structure can facilitate storage and access of this document as a "legacy document". The particular motivations for converting documents are diverse, typically including intent to reuse or repurpose parts of the documents, desire for document uniformity across a database of information store, facilitating document searches, and so forth. Technical manuals, user manuals and other proprietary reference documents are common candidates for such legacy conversions.

A particular problematic issue that arises during the conversion process is the rebuilding or preserving of structural information. The output structure can be very different from the input structure. For example, page segmentation is often discarded in a logical representation, where logical units are elements such as chapters and sections (pages are usually considered as a physical element and do not appear). Content elements related to this page segmentation, typically headers and footers, and present in the input document have then to be processed cautiously. In prior art converters (PDF2[XML/HTML]), headers and footers are not differentiated from the body elements and can disrupt the flow of the main text. This not only generates an incorrect logical document, but can also introduce noise for further processing (natural language processing, for instance). Accordingly, the existing methods and apparatuses for identifying and extracting pagination constructs in the conversion of structured legacy documents is neither efficient nor robust. Of particular note is Xiaofan Lin, *Header and Footer Extraction by Page-Association*, Hewlett-Packard Technical Report, www.hpl.hp.com/techrepports/2002/HPL-2002-129.pdf, 2002. This reference relies upon comparison with neighboring pages for identifying a particular relationship indicative of commonly configured headers/footers. Such neighboring page comparison techniques can fail when the header/footer occurs very few times in the document.

For purposes of this application, "header" is intended to comprise matter (textual content) that is printed at the top of every page of the document typically positioned in the top margin of the page, for example, a title, page number, file name, revision dates, the author's name, or any other information about the document that is repeated throughout the document or a portion of the document. Likewise, a "footer" is similar information content positioned in the bottom margin of the page. As used in the subject application, "header/footer" should be construed to include either a header or footer individually or in combination.

The copending, commonly assigned applications comprise U.S. Patent Application Publication No. 20060155703A1, entitled, Method and Apparatus for Detecting a Table of Contents and Reference Determination, by Herve Dejean et al.; U.S. Patent Application Publication No. 06-0155700-A1, entitled, Method and Apparatus for Structuring Documents Based on Their Layout, Content and Collection, by Herve Dejean et al.; and U.S. Pat. No. 7,165,216, entitled, Systems and Methods for Converting Legacy and Projecting Documents Into Extended Markup Language Format, by Boris Chidlovskii, which are herein incorporated by reference.

The following provides improved apparatuses and methods that overcome the above-mentioned disadvantages and others to provide a light and robust method and system for detecting headers and footers of a document.

BRIEF DESCRIPTION

A method and apparatus is provided for detecting pagination constructs, i.e., textual elements of a document that were introduced by the pagination, which is particularly useful for more efficiently converting an unstructured document into a structured document during legacy document conversion. Pagination constructs can be characterized by the fact that their number of occurrences in the paginated document directly depends on the size of the pages in the document. At the extreme, each of the constructs would occur only once if the document were to fit on a single large enough page. Such constructs typically include the page headers and footers, but are not restricted to merely those types. For instance, it also includes a textual header of a table spanning multiple pages. When a document is segmented to pages, a model of the document can be assumed wherein the pages have a certain size to contain textual elements (text-boxes) with some coordinates (x, y, width, height) on the page and some textual content. By measuring text-box-to-text-box similarity as defined by such features as textual content, text-box position and area on a page, and the distance within the document in terms of number of pages the text-boxes are on, pagination constructs can be identified when the similarity is determined to be above a certain threshold.

A more particular method and apparatus is described for detecting a header/footer. In header and footer zones, it is a fact that the text content variability is much lower than in the main body of text content in a document page. The subject method and apparatus rely upon this factual basis to identify the header and footer zones in the document. Such methods and apparatus are especially useful as a preprocessing step in order to delete the noise introduced by headers and footers, and to better facilitate content-based processing, such as legacy document conversation. In one embodiment for identifying the header/footer of a document, a relative position of textual content of the document is identified. A textual variability of the content of the identified relative position is computed. The textual variability is compared with a predetermined textual variability known as indicative of a header/footer content. The header/footer of the document is then set by associating contiguous contents having the predetermined textual variability. The identifying of the relative position typically comprises allocating a relative vertical position, such as line numbering per page of the document. The textual variability is computed by fragmenting the text content into a number of text fragments with text blocks and differentiating the text fragments into predetermined different kinds. The ratio comprising the percentage of different kinds of text fragments and the total number of text blocks for a particular portion of the document is used as an indicator of the candidacy of that portion as a header/footer. A particular value of the relationship has been empirically determined to be a reliable comparative value.

In accordance with another aspect of the an illustrated embodiment, surrounding content elements to the header/footer lines identified as above are merged into the header/footer line list even where a textual variability computation indicates that such lines by themselves are not likely header/footer candidates, when the number of text blocks and the number of different kinds of fragments including text blocks in the surrounding lines is added to the pre-identified header/footer zone line list and there is no increase in the value of the textual variability for the overall list. Such a computation would generally indicate that the kinds of text blocks in the surrounding lines are already within the header/footer line list so that they are likely portions of the header/footer zone.

In accordance with another aspect of the disclosed embodiments, an apparatus is disclosed for identifying a pagination construct such as a header/footer in a document. A text fragmenter segregates the document into pages and differential text blocks on the pages. The text blocks are identifiable with respect to relative zones within the page, e.g., the top half or bottom half of the page. A processor computes a textual variability score (TVS) for the text blocks. The TVS comprises of the relationship between a total number of text blocks and a number of different kind of text blocks within a selected zone of the page. A selector selects a potential header/footer text contents comprising a compilation of text blocks having a TVS indicative of header/footer content whereby a selected text content is set as the header/footer. The selector first associates a header/footer content by page line computation of TVS for the textual content therein and secondly associates contiguous line content all having a preselected TVS indicative of header/footer context.

Various alternatives with the above-mentioned and further features and advantages will be apparent to those skilled in the art from the specific apparatus and its operation or methods described in the examples below, and the claims.

THE FIGURES

Figure 2:
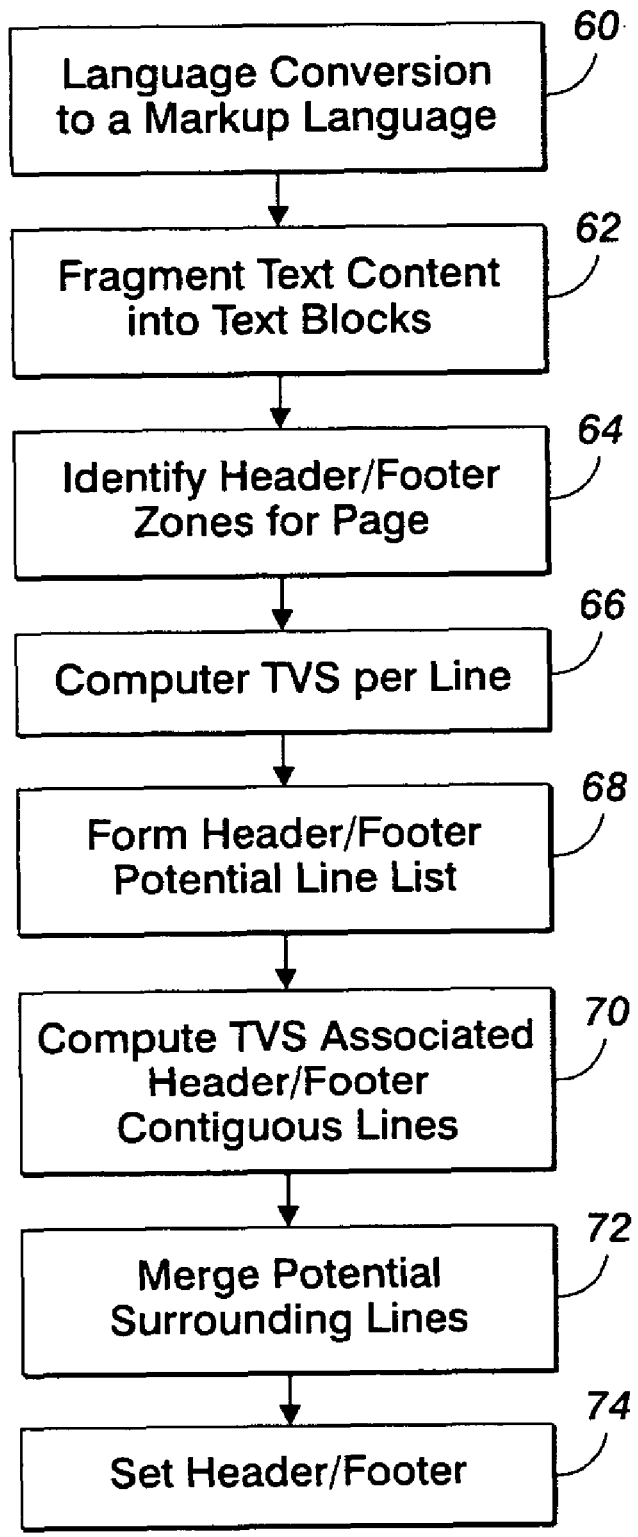
Figure 4A:
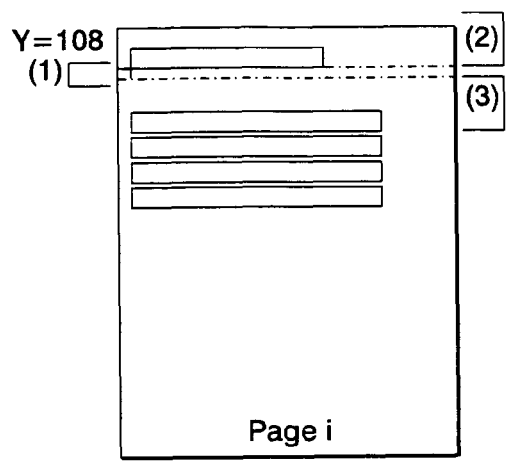
Figure 4B:
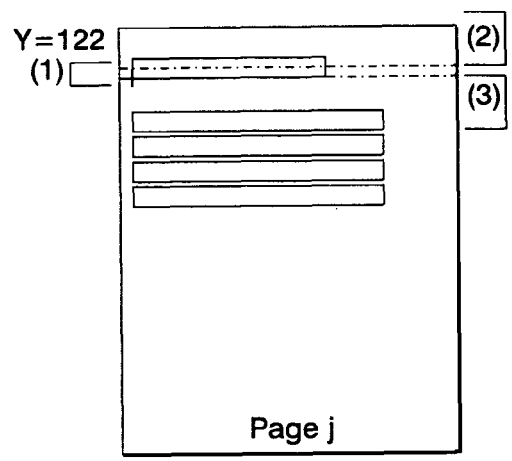
Figure 4C:
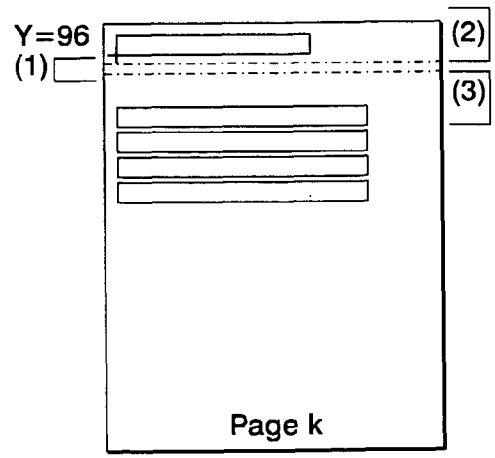
Figure 5:
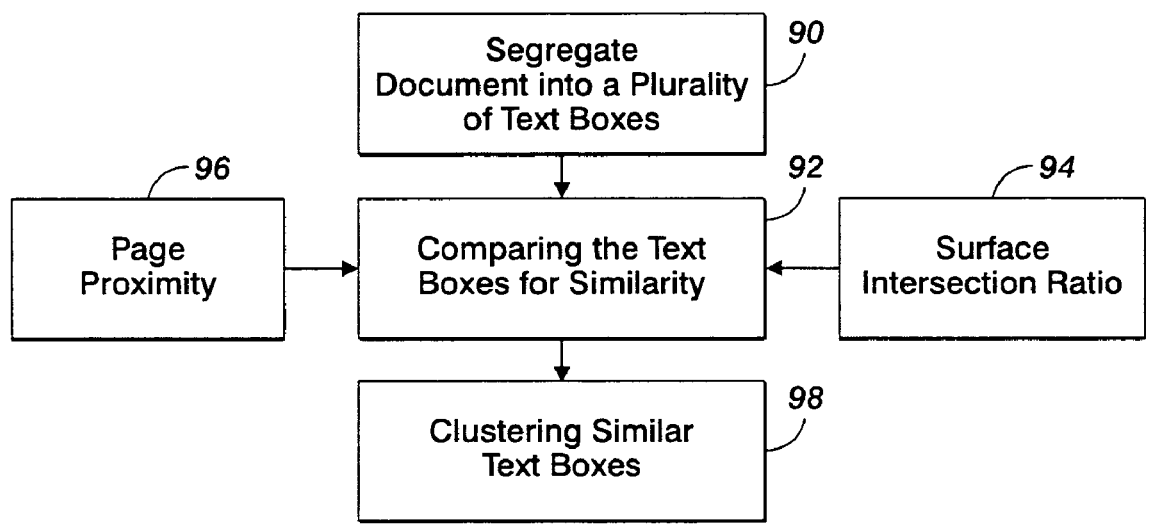

FIG. 1 diagrammatically shows an apparatus for identifying a header/footer portion of a document;

FIG. 2 comprises a flowchart of a method for identifying the header/footer portion of the document;

FIGS. 3A and 3B diagrammatically show how textual elements can be identified by spatial position on a page;

FIGS. 4A, 4B and 4C illustrate how contiguous and surrounding text elements can be merged into a header/footer zone; and FIG. 5 is a flow chart of alternative process for detecting pagination constructs.

DETAILED DESCRIPTION

The subject embodiments have an overall purpose of detecting a zone at the top of a page of a document and at the bottom of a page of a document, which corresponds to a pagination construct such as a header or footer zone. Efficient characterization of such zones as shown herein, use the following heuristic: In a header or footer zone, the textual variety is much lower than in the body page of the document. The illustrated embodiments for header/footer detection may comprise at least four steps:

1. position allocation,
2. text normalization,
3. textual variability computation, and
4. header/footer zone detection.

These steps, and others, will be described in detail with reference to the drawings and wherein FIG. 1 shows an assembly wherein an unstructured document 10, e.g., a technical manual or the like in a PDF format, is converted by conversion processor 12 into an alternative language format such as XML, and when in such format can be processed for various purposes as a legacy document. It has been observed that the inclusion of headers and footers in such converted formatted can be responsible for the introduction of undesired noise when accessing the legacy document so that the identification of the header/footer as a preprocessing step can be particularly beneficial to enhancing the efficiency in accessing the document.

Text fragmenter 14 breaks the converted document into an order sequence of text fragments comprised of pages and text blocks 16, and which are typically loaded as a list of text strings from a text from an XML file produced from the document using an off-the-shelf converter. A paper document is suitably scanned using an optical scanner and processed by optical character recognition (OCR). For a text document, each line suitably becomes a fragment ordered line-by-line. For an XML or HML document, each PCDATA suitably becomes a text fragment. Fragmenter 14 also affects a position allocation of the document text content so that the page segmentation and vertical positions per page of the text content are preserved. For plain text format, the vertical position used is a line number. For proprietary format, the document can be converted into plain text format, or can be converted into a format where information about the vertical position exists. For example, a PDF2XML converter can provide page segmentation and positional information of the blocks of texts.

With reference to FIG. 3A, a document page having the text elements shown therein can be converted to relative positions within the document by identifying a text block spatial position on the page corresponding to the y axis (FIG. 3B). The positional information (line number or y coordinate) used is hereinafter identified as the position of the text content candidate. Positional application thus comprises characterizing each element (line or block of text) on the page of the document by its vertical position as either a line for plain texts or a y coordinate provided by converters for proprietary formats. It is assumed that a header will likely occur in the top half of a page and the footer will occur in the bottom half of the page.

With reference to FIG. 2, the steps for such conversion fragmenting and header/footer zone identification are identified as steps 60, 62 and 64.

Once the text blocks with their positions have been identified, textual content is preferably normalized. All digits [0-9]

are replaced by a unique character (D). Such normalization is preferably the only normalization applied and is due to the frequent presence of page/chapter/section numbers and date in headers/footers, which introduces a textual variability which is not relevant for the subject discussions.

A processor 18 effects the textual variability computation. The different positions of all the textual blocks in a document are listed. For each position a computation is performed for associating the number of text blocks occurring at the position and the total number of different types of fragments including text blocks occurring at the position taking into account the whole document, e.g. all the pages of the document. A textual variability score (TVS) for each position is computed as follows:

$$\text{tv\_score (1)} = \frac{\# \text{ different fragments with text blocks}}{\# \text{ total number text blocks}}$$

Table 1 below shows the fragments with text blocks occurring at a position 108 for all pages and their frequencies in the document (e.g., a technical manual).

TABLE 1

| Texts at position 108 |
| --- |
| Frequency |
| Installing and Configuring 10/100Base-TX/9000 |
| 25 |
| Configuring Network Connectivity Using SAM |
| 05 |
| 10/100Base-TX Interface Card Statistics |
| 09 |
| Hardware Regulatory Statements |
| 03 |
| 100Base-TX Resources |
| 09 |
| Hardware Reference Information |
| 09 |
| Troubleshooting 10/100Base-TX/9000 |

Table 1 shows seven different types of fragments with text blocks but the total number of all text blocks within all seven types is 93 text blocks. Applying Equation 1 to the text content of Table 1 would thereby result in a textual variability score at position 108 of 7/93 or 0.075.

Table 2 below shows a TVS score for six different positions in a page of the document.

TABLE 2

| Position |
| --- |
| #Text Blocks |
| #Different Text Blocks |
| Textual Variability |
| 96 |
| 5 |
| 3 |
| 0.6 |
| 108 |
| 93 |
| 7 |
| 0.08 |
| 122 |
| 89 |
| 32 |
| 0.35 |
| 143 |
| 1 |
| 1 |
| 1 |

TABLE 2-continued

| Position |
| --- |
| #Text Blocks |
| #Different Text Blocks |
| Textual Variability |
| 155 |
| 17 |
| 11 |
| 0.67 |
| 156 |
| 47 |
| 45 |
| 0.96 |

The top element in the Table comprises the relative line position (e.g., 96, 108, etc.), the second line comprises the total number of text blocks at the line position (e.g., 5, 93, etc.), the third line number comprises the total number of fragments including text blocks at the position (e.g., 3, 7, etc.), and the last item for each set comprises the computed textual variability score (e.g., 0.6, 0.08, etc.).

As Table 2 shows, the textual variability of the element at position 108 has a very low score, while the textual variability of the element at position 156 has a very high score. The element 108 has 93 occurrences of text blocks (which means that 93 blocks of text were positioned at the location y=108). Among these 93 occurrences, only 7 were different kinds of text fragments. After the TVS for all of the lines of the document have been computed, they are stored in a database 20, 68 and based upon the scores, selective ones of the lines are identified as potential header/footer data and can be used for detecting the header/footer zone. More particularly, once the variability score for each content element (a content element is composed of a position number in the text blocks occurring at this position in the document) is computed. An effort is made to identify whether the document has header zones and footer zones. The method comprises identifying a first textual content element whose TVS is predetermined to likely comprise a part of the header/footer zone. The zone is extended from this textual element by merging all contiguous content elements in order to find the largest possible header/footer zone.

The identification number of potential header/footer textual content element is accomplished by preselecting a given TVS threshold which has been empirically determined to give a likely identification of a header/footer content element. In the present embodiment the threshold θ was set at 0.5 so that all content elements with a TVS lower than 0.5 are identified as potential header/footer textual content elements. The threshold can be selectively set at different values based upon empirical results for the type of document being converted for legacy storage and access.

Continuing with the example of the selective first top element and first bottom elements identified in Table 1, Table 3 below indicates which elements are potential header/footer textual content candidates:

TABLE 3

| Position |
| --- |
| #Text Blocks |
| #Different Text Blocks |
| Textual Variability |
| Potential Candidate (θ = 0.5) |
| 96 |
| 5 |
| 3 |

TABLE 3-continued

Position
Text Blocks
Different Text Blocks
Textual Variability
Potential Candidate (θ = 0.5)

0.6
No
108
93
7
0.08
Yes
122
89
32
0.35
Yes
143
1
1
1
No
155
17
11
0.67
No
156
47
45
0.96
No
...
...
...
...
...
...
...
...
...
...
...
652
5
1
1
No
655
1
1
1
No
684
204
7
0.03
Yes

In order to define the top content element in the header zone and the bottom contact element in the footer zone, one starts from the top of the page for the header and at the bottom of the page for the footer. The first contact element starting from the top of the page or from the bottom of the page having a TVS indicative of a header/footer would be the initial textual content element of either the header/footer. For the header detection, the initial selected element must occur in the upper half of the page, and for the footer detection, the initial contact element must occur in the lower half of the page. If no element is identified that has the required TVS, then the subject method considers that the document has no header or no footer. In the example of Table 3, the element 108 is identified as the initial contact element and the element 684 as the initial footer content element.

Expansion of the header/footer zone beyond the initial contact elements comprises merging of contiguous elements to the initial content elements. More particularly, any contiguous textual content elements to the initial contact element having a TVS lower than θ also belong in the header/footer zone. Starting with the initial contact elements in the header and footer zones, a list with all the contiguous potential textual contact candidates is built. The augmented list comprises a new larger header/footer zone. A new TVS for the augmented list is computed 70 by applying the formula of equation 1 for the entire number of text blocks in the list as a divisor for the total number of different types of fragments including text in the list. (By construction, the new augmented list also has a variability score lower than θ). Continuing with the Table example, the element 122 is added to the initial element 108. The score of the header list is 0.23. The footer list is only composed of the element 684, since no adjacent element has a score below θ.

The merging process is especially useful in order to smooth the textual contacts elements position. In converted documents (for example, a PDF document converted in XML), a small variation in the position of elements per page can occur. For example, the position of the first paragraph in the body page can start at position 61 for some pages, 62 for other pages or 63. The subject method does not require a specific (pre)processing for these elements. The body page of textual contact elements thus corresponds to content elements contiguous to the header/footer zone whose line TVS is higher than θ.

It is another feature of the subject embodiments that surrounding line elements to the header/footer zone are further investigated for identifying previous and following elements whose variability is higher than θ, but which line elements should also be considered nevertheless as components of the headers/footers. The merging 72 of potential surrounding lines in processor 24 is affected by determination that the preceding and following elements are appropriate for insertion into the header/footer zone if a lines insertion decreases the TVS of the new augmented list. More particularly, and with references to FIGS. 4A, 4B and 4C, it can be seen that the header zone augmented list is composed of line contact elements 108, 122 which have been merged as a result of their individual TVS. This surrounding element 96 is then next tested to determine if it can be inserted into the header zone and if the new TVS of the augmented list plus element 96 would be lower. Accordingly, the textual content, i.e., text blocks and number of different kinds of text blocks, is added into the list for computation of a new TVS. In this case element 96 does in fact lower the overall TVS of the augmented list plus surrounding line 96 so that the line content relative to 96 is in fact added to the header. The content of line element 143 is similarly tested, but the score of the augmented list plus surrounding line element 143 is 0.24 which is higher than the old score (0.23). Accordingly, the content element of the text occurring at the position 143 should not be added to the header zone and is not added to the augmented list. Line element 143 is not inserted and the merging of contiguous lines to identify the header zone then stops. The same procedure is effected for the initial contact elements, plus merge lines, plus surrounding lines for the footer zone.

The steps for effecting merger of surrounding elements is to integrate textual content elements whose individual line TVS is higher than the threshold, but which can still be actual header/footer content elements.

Another aspect of the subject embodiments considers whether the identified list of header elements may not start from the top of the page. For example, with reference to FIG.

4C, if line element 96 failed to satisfy the preceding process steps for insertion into the header zone. More generally, some line elements which surround the augmented list as defined above, and which have a relatively high textual variability ($\theta>0.5$) should also be considered for insertion within the header zone. These are usually elements with a very low frequency (5 for element 96, 1 for element 143), which are due to some very small variation of their position. For example, a line element which occurs only once in the document will have a TVS equal to 1. Accordingly, it is an alternative feature within the subject embodiments that an alarm mechanism may be triggered when all of the line elements between the identified list of header elements and the top of the page (or bottom for footer zone) are not merged into the header/footer. The list of such pages where such line element noninsertion occurs is generated for possible post-correction or post-validation. As an empirical matter, all of the line elements occurring between the beginning of the page and the header list are all portions of the header zone, and the alarm mechanism is an easy way to detect potential problems. As a consequence of such an alarm mechanism, the highest position of the header zone is returned and the lowest position of the footer zone is returned. In the previous reference to the current example, the couple 122, 648 is returned so that all line elements per page whose position is lower or equal than 122 (i.e. extending toward the top of the page) are recognized as elements of the header zone, while all elements whose line position is higher or equal than 648 (i.e., extending toward the bottom of the page) are recognized as elements within the footer zone.

Alternatively, in order to reduce the processing time, only a selected number of the first n top elements, and a selected number of the first n bottom elements can be selected for processing in accordance with the steps identified above. As a practical matter, considering all elements of a document should not deteriorate the overall method performance, which should be very fast, no more than a few seconds for a 1,500 page document.

With reference to FIG. 5, an approach for detecting pagination constructs in a document introduced as a result of the pagination resulting from the legacy document conversion is illustrated. The textual elements (i.e., pagination constructs) so introduced can be characterized by the fact that their number of occurrences in the paginated document directly depends on the size of the pages. At the extreme, each construct would occur only once if the document were to fit on a single large enough page. Such constructs typically include the header/footer, but are not restricted to merely these types. For instance, it may also include the textual header of a table spanning over multiple pages when the header repeats itself on those pages. Such tables are common portions of technical manuals. The subject embodiment relies on the clustering of the pagination constructs within an appropriate distant measure. It is therefore valuable in legacy document conversion since the pagination elements constitute noise for further processing.

For purposes of this embodiment, it is considered that the document is segregated 90 into a plurality of text-boxes. It is assumed that the model of the document, where the document is segmented into pages is comprised of pages having a certain size and containing textual elements with some coordinates (x, y, width, height) on the page and some textual content. It is a general model that most PDF2HML converters use. For purposes herein, such textual elements will be referred to as a "text-box". The text-boxes are compared 92 for text-box similarity measure, taking values that take into account three features: first, their textual content, second, their positions in areas on the page, and third, their distance in terms of the number of pages they are on. More particularly, the similarity measure 92 is comprised of a combination of these three measures. First, textual similarity, is valued as 1 if the two texts are equal, or 0 otherwise. Alternatively, an edit distance, coupled or not with some text normalization can be used. Text normalization permits in particular the detection of a page number as a pagination element, while the strict equality test fails since each page is a different number. Second, geometric similarity may optionally comprise a page centering or text-box thickness. Page centering relates to the changing of the coordinate system of each page. The origin of the new coordinate system moves from the top left corner (typically) to the center of the box bounding all text-boxes on the page. The centering operation is useful in dealing with global translation of text-boxes between odd and even pages, which appears in dome documents, some other collections do not need it. Making the text-boxes border thicker by T pixels to prevent more displacements from one page to another is also useful in assessing geometric similarity where T is an empirically preselected value. The geometric similarity would then be defined 94 as the ratio of the surface of the intersection of two text-boxes by the surface of their union. The third measure for similarity comprises page proximity 96. It is assigned a value of 1 if the two text-boxes are on pages closer than P (a preselected number) of pages, 0 otherwise. This defines a window of page proximity of pages around each text-box out of which the similarity falls to 0.

Similar text-boxes can then be clustered 98 using a classical agglomerative single-link clustering algorithm. *Data Clustering: a review, ACM Computing Surveys*, (CSUR) Volume 31, Issue 3 (September 1999), A. K. Jain, M. N. Murty, P. J. Flynn. The similarity spatial data is set to 0.5. Clusters grouping elements having a similarity above $\theta$ are those containing pagination elements. Other clusters are ignored, including those with a single text-box inside.

The claims, are originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for identifying a header/footer of a document for facilitating structural legacy document conversion of the document, the method comprising:

identifying a relative line position of content on a page of the document;

computing by a processor a number of different fragments with text blocks in the document included at the relative line position;

computing by the processor a total of all text blocks occurring at the relative line position for all pages of the document;

computing by the processor a textual variability score for the relative line position by dividing the number of different fragments with text blocks by the sum of all text blocks;

comparing the computed textual variability score with a predetermined textual variability score indicative of a header/footer; and;

associating contiguous contents having the predetermined textual variability score wherein the associated contents are construed to comprise the header/footer.

2. The method of claim 1 wherein the identifying comprises allocating a relative vertical position.

3. The method of claim 2 wherein the identifying comprises page segmentation and line numbering per page of the document and wherein the relative position of the content comprises an allocated line number.

4. The method of claim 3 wherein the identifying further includes normalizing the content.

5. The method of claim 1 wherein the computing of the total of text blocks includes;
fragmenting the document content into a number of text elements; and,
differentiating the text elements into predetermined different types of text blocks.

6. The method of claim 5 wherein the differentiating comprises recognizing the different kinds of text blocks included in the converted legacy document.

7. The method of claim 1, wherein the predetermined textual variability score indicative of a header/footer comprises a textual variability score of about 0.5.

8. The method of claim 1, wherein the associating comprises merging contents having a textual variability score lower than the 0.5 to form a potential header/footer zone.

9. The method of claim 1 wherein the associating comprises identifying a first content element occurring in a header/footer zone having the predetermined textual variability score indicative of a header/footer, and merging contiguous content elements also having the predetermined textual variability score therewith for the identifying of the header/footer.

10. A method for identifying a header/footer in a page of document for improved efficiencies in conversion of the document from a first format to a second structured format in legacy document conversion, the method comprising:
detecting zones in the page indicative of document content comprising potential header/footer content, including:
(i) computing by a processor a number of different fragments with text blocks for a select vertical position for all pages of a document;
(ii) computing by a processor a sum of text blocks occurring at the select vertical position for all pages of the document;
(iii) computing by a processor a first textual variability score (TVS) for the select vertical position by dividing the number of different fragments with text blocks by the sum of text blocks; (iv) identifying textual content as header/footer content when the TVS is representative of the header/footer;
(v) merging the textual content of contiguous line positions when a corresponding TVS indicates contiguous header/footer content to form a header/footer augmented line list;
(vi) computing a second TVS for the header/footer augmented line list;
(vii) merging surrounding content elements into the header/footer augmented line list when an insertion of the surrounding content elements into the line list results in a third TVS computed to be less than the second TVS; and
(viii) setting the header/footer zones of the page when no more surrounding content elements can be merged in accordance with the (v) merging.

11. The method of claim 10 wherein the second TVS is computed with a compiled number of text elements and a compiled number of different kinds of text blocks for all the lines in the header/footer augmented line list.

12. The method of claim 11 wherein the identifying of the header/footer for a single page is effected with reference to textual content for an entire document including the single page.

13. The method of claim 11 wherein an alarm is made for textual content failing to satisfy the merging steps and content positioned higher/lower than the set header/footer zone, for adding the failing content to the header/footer zone.

14. An apparatus for identifying a header/footer in a document, the apparatus comprising:
a text fragmenter for segregating the document into pages and differentiable text blocks on the pages, and wherein a list of the text blocks for all the pages in the document are identifiable with respect to a relative zone within the page;
a processor for computing a textual variability score (TVS) for the text blocks, and wherein the TVS is a quotient representing a relationship between a dividend defined by a total number of different fragments with text blocks in the list at the relative zone and a divisor defined by a number of text blocks within the list at the relative zone; and,
a selector for selecting potential header/footer text content comprising a compilation of text blocks having a TVS indicative of header/footer content whereby the selected text content is set as the header/footer.

15. The apparatus as defined in claim 14 wherein the relationship comprises a small percentage of the number of different kinds of text elements within the total number of text blocks within the selected zone.

16. The apparatus as defined in claim 14 wherein the text fragmenter segregates the document into the kinds of text blocks, predetermined as differentiable text blocks in accordance with a converted legacy document.

17. The apparatus of claim 14 wherein the selector first associates header/footer content by page line computation of TVS of textual content therein, and second associates contiguous line content all having a preselected TVS indicative of header/footer context.

18. The apparatus of claim 16 wherein the selector further merges surrounding line text content with the associated contiguous line content as header/footer content when a compiled TVS for the merged surrounding and contiguous line content has a lower TVS than a computed TVS for the contiguous line content.

* * * * *